(No Model.)  
2 Sheets—Sheet 1.

C. B. COTTRELL.
MEANS FOR TRANSMITTING ROTARY MOTION AT DIFFERENT SPEEDS.

No. 448,776.  
Patented Mar. 24, 1891.

(No Model.) 2 Sheets—Sheet 2.

C. B. COTTRELL.
MEANS FOR TRANSMITTING ROTARY MOTION AT DIFFERENT SPEEDS.

No. 448,776. Patented Mar. 24, 1891.

Witnesses:
C. Sundgren
D. H. Hayward

Inventor:
Calvert B. Cottrell
by attorneys
Brown & Seward

UNITED STATES PATENT OFFICE.

CALVERT B. COTTRELL, OF WESTERLY, RHODE ISLAND.

MEANS FOR TRANSMITTING ROTARY MOTION AT DIFFERENT SPEEDS.

SPECIFICATION forming part of Letters Patent No. 448,776, dated March 24, 1891.

Application filed January 9, 1891. Serial No. 377,192. (No model.)

*To all whom it may concern:*

Be it known that I, CALVERT B. COTTRELL, of Westerly, in the county of Washington and State of Rhode Island, have invented a new and useful Improvement in Means for Transmitting Rotary Motion at Different Speeds, of which the following is a specification, reference being had to the accompanying drawings.

The principal object of my invention is to effect automatically without stopping the machine and without changing the velocity of the driving-shaft a temporary reduction of the speed of the impression-cylinder of a printing-machine for the purpose of permitting the automatic shifting of the tympan-sheet thereon.

The accompanying drawings illustrate the application of my invention to a printing-machine, but represent only such portions of the machine as are necessary for the explanation of the invention.

Figure 1:
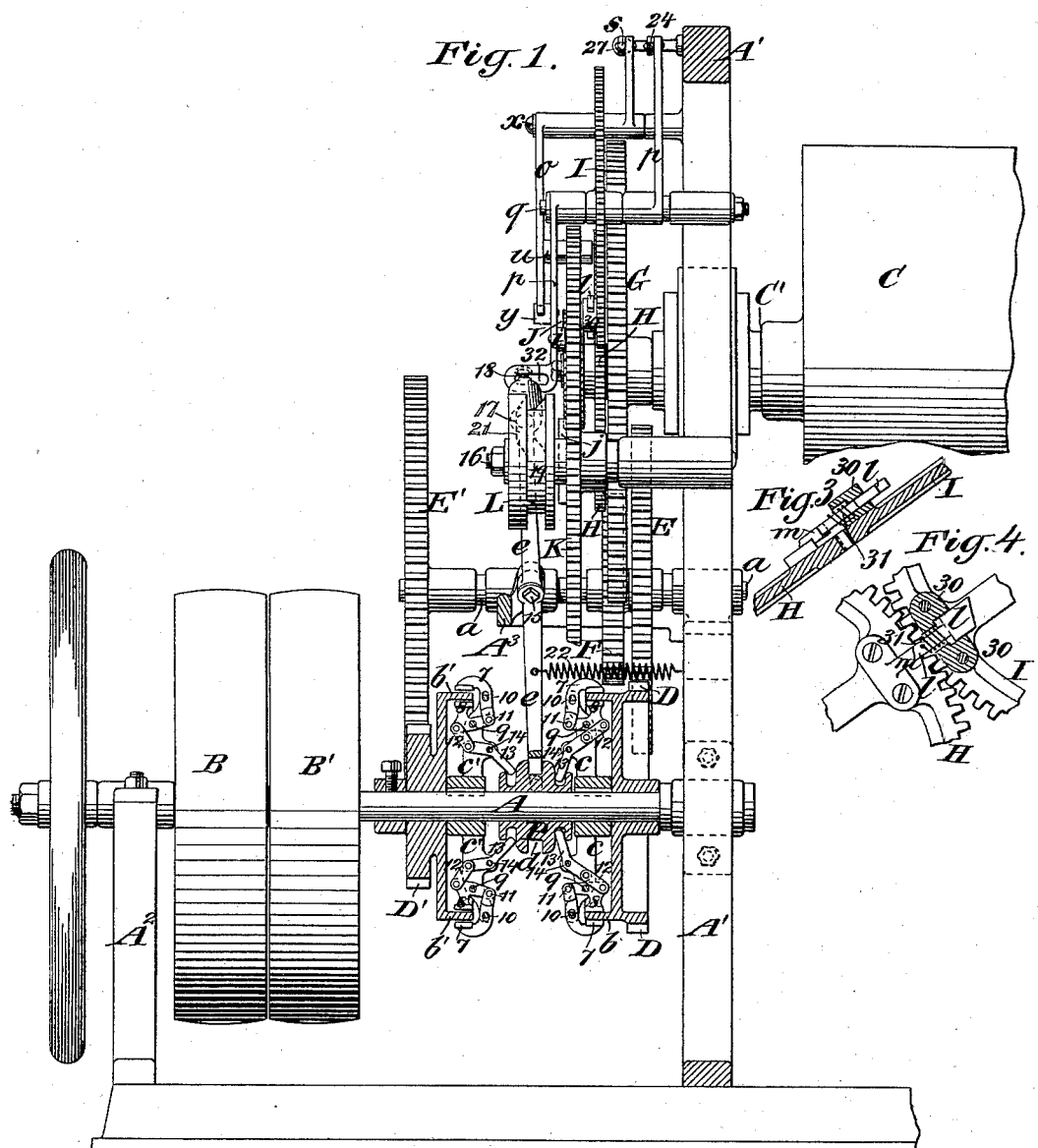
Figures 2, 5:
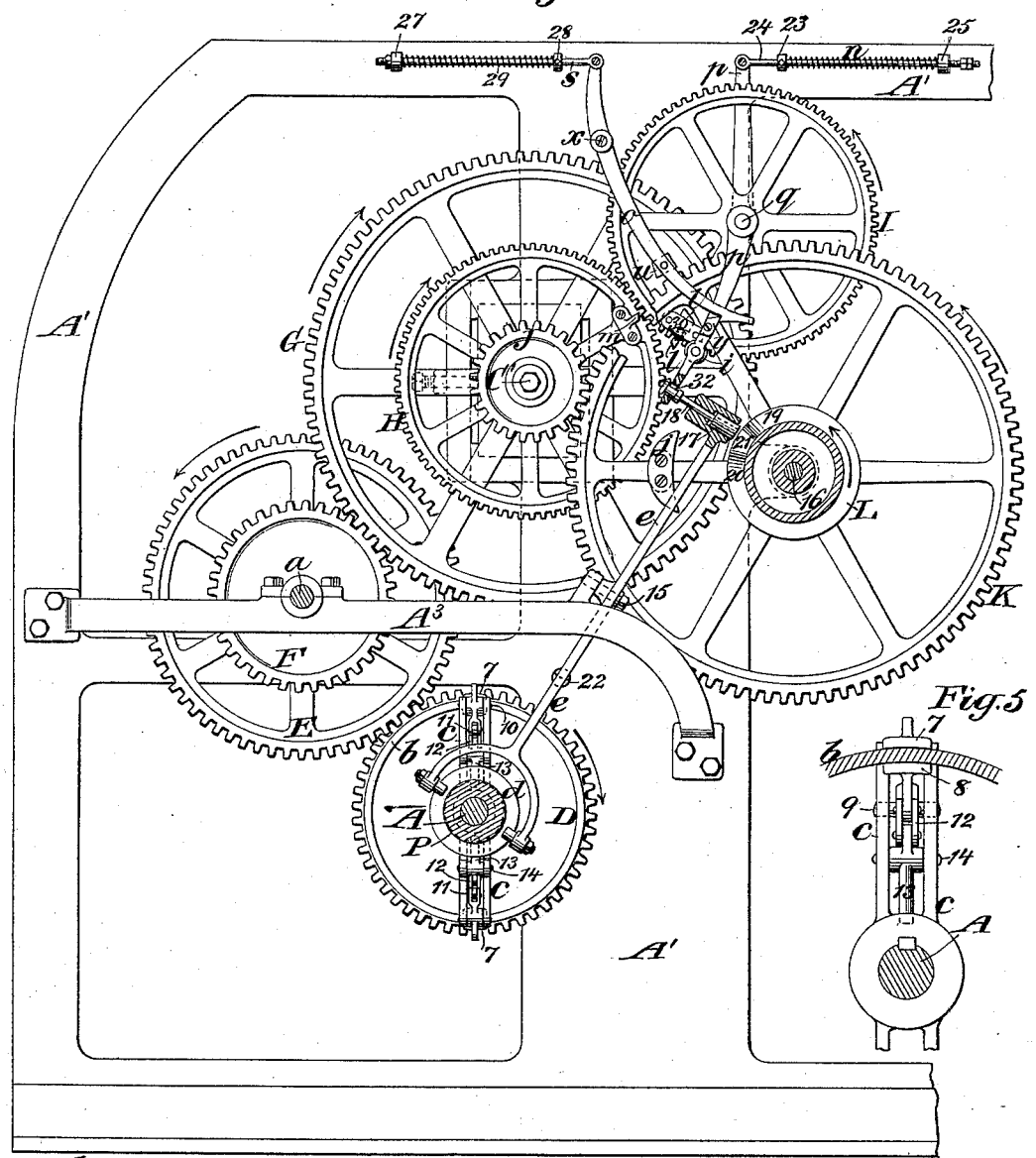

Figure 1 is a view representing the driving-shaft and portions of the cylinder and framing of the machine, taken parallel with the axes of the said shaft and cylinder, some of the parts being shown in section. Fig. 2 is an elevation corresponding with Fig. 1, taken from the outside of the machine at right angles to Fig. 1 and showing some of the parts in section. Figs. 3, 4, and 5 are detail views which will be hereinafter explained.

Similar letters and numerals of reference designate corresponding parts in all the figures.

A designates the driving-shaft of the machine running in bearings in one of the side frames A' and in a standard A² outside thereof and furnished with a loose driving-pulley B and a tight driving-pulley B'.

C is the cylinder, having its shaft C' supported in bearings in the side frames A', one of which only is shown.

The driving-shaft A has upon it two spur-gears D D' of different size, gearing, respectively, with two gears E E' of inversely-corresponding different size, both fast upon an intermediate shaft $a$, which runs in bearings in the side frame A' and a bearing in a bracket A³, secured to the said frame. This shaft $a$ has also fast upon it a spur-gear F, gearing with a spur-gear G, fast upon the cylinder-shaft C'. The gears D, E, F, G and the gears D' E' F G constitute two differently-proportioned trains of gearing between the shafts A and C', the gears F G constituting parts of each train. The two spur-gears D D' are fitted to turn loosely upon the driving-shaft A and are furnished with clutches or engaging devices, to be presently described, by which either one may be fastened to the said shaft while the other one remains free to turn thereon. Whichever one of these gears D D' is fast upon the shaft operates through its respective gear E or E' the shaft $a$ and the gears F and G to drive the cylinder. It is obvious that when the smaller gear D' is fast to the driving-shaft the cylinder will be driven at a slower speed than when the larger gear D is fast thereto. Under normal conditions the larger gear D will be fast to the shaft A and the cylinder C will be driven at an operative speed for printing.

The clutches or engaging devices may be of any suitable kind, but are represented in Figs. 1 and 2, and in part on a larger scale in the side view, Fig. 5, as consisting of clutch-rings $b$ and $b'$, cast upon or firmly secured one to each of the spur-gears D D', and two clutch-yokes $c$ and $c'$, firmly keyed to the shaft A and provided with arms which carry jaws 7 8, for gripping the clutch-rings $b$ $b'$. The said jaws 8 are formed on elbow-levers, which are fulcrumed at 9 to the arms of the yokes $c$ $c'$, and the jaws 7 are fulcrumed at 10 to the said arms and are pivoted at 11 to the levers of the jaws 8, the said levers being connected by toggle-links 12 with the ends of toggle-levers 13, which are fulcrumed at 14 in the arms of the yokes $c$ $c'$, the other ends of said toggle-levers running in grooves in a collar P, which is capable of sliding lengthwise on the shaft A. This collar P has a central groove $d$ between the grooves which receive the toggle-levers 13, and within this groove $d$ the said collar is embraced by the forked lower end of a clutch-operating lever $e$, which is fulcrumed on a pin 15, carried by the bracket A³. This lever $e$ serves to move the collar lengthwise upon the shaft, and by that movement the toggle-levers 13 of the two clutches are so operated as to couple the members of one clutch and uncouple the members of the other for the purpose of engaging one of the gears D D' with and disengaging the other from the driving-shaft A. The said lever $e$, when in the position represented in Figs. 1 and 2, produces the engagement of the spur-gear D and the disengagement of D', as in the normal operative condition of the machine, and it is only necessary that the said lever shall be so operated upon after a given number of revolutions of the cylinder at the normal operative speed as then to produce the disengagement of the gear D from the driving-shaft and the engagement of the gear D' therewith for the purpose of causing the cylinder to make a sufficient number of revolutions at a sufficiently slow speed to permit the automatic shifting of the tympan or tympans on the cylinder. After such number of revolutions has been completed, the lever being returned to its original position to produce the disengagement of the gear D' and the re-engagement of the gear D, the revolution of the cylinder at its normal operative speed will be resumed.

Automatic mechanism of any suitable kind being provided between the cylinder and the clutch-lever $e$ to move the said lever in one direction and the other, respectively, at the proper times, the speed of the cylinder will be changed from fast to slow and from slow to fast as often as may be desired. I will proceed to describe that example of such automatic mechanism which I have represented in the drawings.

J is a pinion fast on the cylinder-shaft C', gearing with and driving a spur-gear K, turning loosely on a fixed stud 16, secured to the framing A'. This gear carries a cam L, having in its periphery a groove for the reception of an anti-friction roller 17 on the end of a pin 18, which is carried by and capable of moving lengthwise through the upper end of the clutch-lever $e$, the said cam serving, by its action on the said roller 17, to actuate the clutch-lever to shift the clutches on the main shaft at the proper intervals for changing the speed of the cylinder. The groove in the cam L consists of two portions which are both parallel with the plane of revolution—viz., a longer portion 19 20 and a shorter portion 21 offset from the longer portion. When the clutch-lever is in the position (shown in Fig. 1) for the clutch D to be in gear for driving the cylinder at the high normal speed, in which position a spring 22, applied to the said lever, always tends to hold it, the roller 17 is within the planes of revolution of the sides of the shorter offset portion 21 of the cam-groove; but the said roller is kept out of the said groove, as shown in Fig. 2, until just before the change of speed from fast to slow is desired, when the roller 17 is pushed into the cam-groove. The said pin remains in the cam-groove only during one revolution of the cam, which is long enough to engage the gear D with the main shaft and keep it in gear therewith as long as desired for the slow speed of the cylinder. The said pin 18 is attached to the lower arm of a lever $p$, which has its fulcrum upon a fixed pin $q$, secured to the framing A', and the upper arm of which has applied to it a spring $n$, which always tends to press it in a direction to force the roller 17 into the cam-groove, the said spring pressing against a collar 23 on a rod 24, which is connected with the said lever, and which works through a fixed guide 25, secured to the framing A', and the said guide serving as an abutment to the said spring. The lower arm of the said lever has a slotted connection, as shown at 32 in Figs. 1 and 2, with the pin 18, which permits the lateral movement of the said pin and the roller 17 relatively to the cam necessary for the operation of the clutch-lever. The lever $p$ is held back to keep the pin 18 and roller 17 out of engagement with the cam L until the proper time by means of a locking-lever $o$, which works on a fixed fulcrum-pin $x$, secured in the framing A', and which has a hook at its lower end to engage with a projection $y$ on the said lever $p$. The lever $o$ has attached to its upper end a rod $s$, which slides through a fixed guide 27, and which has coiled upon it between its collar 28 and the guide 27 a spiral spring 29, which tends to force the hook of the said lever into engagement with the projection $y$ on the lever $p$, as shown in Fig. 2.

I will now describe the means by which the locking-lever $o$ is operated upon to disengage the lever $p$ at the proper time for the roller 17 to engage with the cam L.

H is a fine-toothed spur-gear fast upon the cylinder-shaft C', and having a beveled lug $m$ secured on the outer face of its rim.

I is another gear of corresponding pitch to that of H, the said gear I turning freely about the fixed pin $q$, before described, and being driven by the said gear H. The said gear does not, however, turn directly on the stud, but upon a sleeve which connects the upper and lower arms of the lever $p$. The gear I has a number of teeth equal to the sum of the number of revolutions which the cylinder is desired to make at its normal speed and the consecutive number which it has to make at its slow speed, and the gear H has one tooth less than I. I will suppose that the gear I has two hundred and fifty-two and the gear H to have two hundred and fifty-one. Fitted to a guide 30 on the gear I is a radially-sliding tappet $l$, both ends of which are beveled, and which has applied to it a spiral spring 31, which always tends to press it outward from the gear. When this tappet is pressed inward against the pressure of its spring, it will in its revolution come into operation against the beveled outer face of a tappet-piece $u$ on the locking-lever $o$, and so push out the said lever and disengage the lever $p$ and allow the roller 17 of the clutch-lever to engage with the cam L. On the face of the gear H is fastened a bevel cam-lug $m$, which is at such distance from the center of said gear that it, during the revolutions of the gears H I, may come in contact with the outer beveled end of the tappet $l$, and so press it inward, as shown in Figs. 3 and 4, of which Fig. 4 represents a face view and Fig. 3 a radial section of those parts of the two gears which carry the said lug and tappet on a larger scale than Figs. 1 and 2. This pushing in of the tappet $l$ always occurs when it is opposite the tappet-piece $u$ on the lever; but with the number of teeth supposed in the gears H I it only occurs once in every two hundred and fifty-two revolutions of the gear H with cylinder, as it only is so often that the cam-lug $m$ and the tappet $l$ come opposite each other. The liberation of the lever $o$, produced by the tappet $l$, always takes place when the shorter offset portion 21 of the cam-groove is passing the roller 17 of the clutch-lever. The throwing of the roller 17 and the clutch-lever out of engagement with the cam always occurs, like the throwing in, when the shorter offset portion 21 of the cam-groove is opposite the roller. This is effected by means of a cam-tappet $j$ on the gear K, which acts against a friction-roller $i$ on the lever $p$, which latter, when pushed back by the said tappet, is reengaged by the locking-lever $o$, and so locked to keep the roller 17 out of engagement with the cam L until the tappet-lug $m$ on the gear H again disengages the locking-lever, as before described. I may here remark that a portion of the rim of the gear K is broken away in Fig. 1 to expose the tappet-lug $m$ to view.

It will be seen from the foregoing description that the roller 17 and pin 18 constitute an automatically-operated engaging and disengaging device between the cam L and the clutch-lever.

To briefly further explain the operation of shifting the clutch-lever at the proper time, I will first suppose the gear D engaged with the shaft A by its clutch and all the parts to be in the positions shown in Figs. 1 and 2, the several gears and cylinder-shaft and main shaft A all rotating in the direction of the respective arrows shown near them. The cylinder will now run at the normal operative speed until in the rotation of the gearing the tappet-lug $m$ on the gear H comes into operation on the tappet $l$ on the gear I, and so causes the latter to act on the tappet-piece $u$ of the locking-lever to unlock the lever $p$, which is then by the spring $n$ caused to throw the roller 17 into engagement with the cam L, which by its continued rotation throws the clutch-lever in the direction to disengage the gear D and engage the gear D' with the shaft A. The cylinder-shaft and cylinder are then slowed down and make a few revolutions at the slow speed, the slow revolution continuing while the roller 17 is in the longer straight portion 19 20 of the cam-groove, and until the offset portion 21 of the groove comes into action and again shifts the clutch-lever to the position just described, when the cylinder resumes its normal speed. This resumption of normal speed is instantly followed by the withdrawal of the roller 17 from the cam by the action of the cam-tappet $j$ on the lever $p$ and the locking of the said lever by the hooked lever $o$. The number of slow revolutions of the cylinder depends upon the length of the longer straight portion 19 20 of the groove of the cam and the velocity of revolution of the said cam as compared with that of the cylinder. About four slow revolutions are sufficient to permit the automatic shifting of the tympan to be performed. By using pinions J and gears K of different sizes the slow speed may be varied as may be desired. It is obvious that these means of driving a shaft at different speeds from a shaft constantly rotating at a uniform speed and of automatically changing the velocity of the driven shaft from the fast to the slow speed, and vice versa, may be applied to two shafts of any other machine as well as to the driving-shaft and cylinder-shaft of a printing-machine. It is also obvious that it would be practicable to substitute pulleys of different size on the shaft A and pulleys of inversely different size on the shaft $a$, and belts to run between those pulleys on the shaft A and those on the shaft $a$, instead of the gears D D' and E E', without making any other changes, and that said pulleys and belts would be the full equivalents of the said gears constituting parts of two differently-proportioned trains of gearing between the shafts A and C'.

What I claim as my invention, and desire to secure by Letters Patent, is—

1. The combination of a driving-shaft and a shaft to be driven, two differently-proportioned trains of gearing between said shafts, clutches for producing the simultaneous engagement with and disengagement from one of said shafts of one and the other of the two trains of gearing, a lever for operating said clutches, and a cam geared with and driven by one of said shafts to actuate said lever periodically to effect the changes of engagement and disengagement of said trains of gearing for changing the speed of the driven shaft, substantially as herein set forth.

2. The combination, with a driving-shaft and a shaft to be driven, two differently-proportioned trains of gearing between said shafts, and clutches for simultaneously engaging either one and disengaging the other of said trains of gearing with and from one of said shafts, of a lever for operating said clutches, a cam geared with and driven by one of said shafts to actuate said lever periodically, and an automatically-operated engaging and disengaging device between said lever and cam, substantially as herein set forth.

3. The combination, with a driving-shaft and a shaft to be driven, two differently-proportioned trains of gearing between said shafts, and clutches for simultaneously engaging either one and disengaging the other of said trains of gearing with and from one of said shafts, of a lever for operating said clutches, a cam geared with and driven by one of said shafts to actuate said lever periodically, an automatically-operated engaging and disengaging device between said lever and cam, a locking device for locking the said engaging device out of engagement with said cam, a spring for throwing said engaging device into such engagement, and a revolving tappet for throwing said locking device out of engagement with said engaging device, substantially as herein set forth.

4. The combination, with the shafts A C' and the two trains of gearing for transmitting motion from one to the other at different speeds, and the clutches and clutch-lever for engaging either one and disengaging the other of said trains, and the cam L for operating the clutch-lever, of the pin 18 and roller 17, movable within the clutch-lever for engaging it with and disengaging it from said cam, the spring-actuated lever $p$ for throwing said pin and roller into engagement, the spring-actuated locking-lever $o$ for locking said pin and roller out of engagement, the gears H and I, having different numbers of teeth, the tappet-lug $m$, and the sliding tappet $l$ on said gears for actuating the locking-lever to liberate the lever $p$, all substantially as herein described.

5. The combination of the shaft C', the clutch-lever $e$, the cam L, the pin 18 and roller 17 on said lever, the spring-actuated lever $p$, connected with said pin, the spring-actuated locking-lever $o$, the gears H and I, the tappet-lug $m$ and tappet $l$, carried by said gears, and the cam-tappet $j$, carried with said cam L for operating on said lever $p$ to produce the disengagement of the clutch-lever $e$ from the cam L, all substantially as herein set forth.

CALVERT B. COTTRELL.

Witnesses:
FREDK. HAYNES,
L. N. LEGENDRE